(12) United States Patent
Yang

(10) Patent No.: US 9,470,319 B2
(45) Date of Patent: Oct. 18, 2016

(54) GATE VALVE WITH LINKAGE STRUCTURE

(71) Applicant: KING LAI HYGIENIC MATERIALS CO., LTD, Hsinchu County (TW)

(72) Inventor: Li-Chuan Yang, Hsinchu County (TW)

(73) Assignee: KING LAI HYGIENIC MATERIALS CO., LTD., Zhubei, Hsinchu County (TW)

( * ) Notice: Subject to any disclaimer, the term of this patent is extended or adjusted under 35 U.S.C. 154(b) by 0 days.

(21) Appl. No.: 14/605,615

(22) Filed: Jan. 26, 2015

(65) Prior Publication Data

US 2016/0215892 A1  Jul. 28, 2016

(51) Int. Cl.
F16K 3/18 (2006.01)
F16K 3/02 (2006.01)
F16K 51/02 (2006.01)

(52) U.S. Cl.
CPC ........... *F16K 3/0218* (2013.01); *F16K 3/0254* (2013.01); *F16K 3/182* (2013.01); *F16K 3/184* (2013.01); *F16K 51/02* (2013.01)

(58) Field of Classification Search
CPC .......... F16K 51/02; F16K 3/18; F16K 3/182; F16K 3/0218; F16K 3/0254; F16K 3/184
USPC ........ 251/193, 194, 203, 204, 158, 200, 201
See application file for complete search history.

(56) References Cited

U.S. PATENT DOCUMENTS

| | | | | |
|---|---|---|---|---|
| 1,630,407 A * | 5/1927 | Roots | ...................... | F16K 3/182 251/158 |
| 1,733,685 A * | 10/1929 | Gamble | .................. | F16K 3/182 251/175 |
| 2,096,420 A * | 10/1937 | Barr | ........................ | F16K 3/182 251/201 |
| 2,626,774 A * | 1/1953 | Palmer | .................... | F16K 3/182 251/169 |
| 2,841,361 A * | 7/1958 | Palmer | .................... | F16K 3/182 251/169 |
| 2,850,260 A * | 9/1958 | Perazone | ................ | F16K 3/182 251/169 |
| 3,321,174 A * | 5/1967 | Schertler | ................... | F16K 3/16 251/158 |
| 4,052,036 A * | 10/1977 | Schertler | ................. | F16K 51/02 251/144 |
| 4,291,861 A * | 9/1981 | Faria | ....................... | F16K 3/184 251/158 |
| 4,491,145 A * | 1/1985 | Williams | ................ | F16K 3/182 137/312 |
| 4,495,966 A * | 1/1985 | Longamore | ............. | F16K 3/182 137/572 |
| 4,817,915 A * | 4/1989 | Tinner | .................... | F16K 3/184 251/167 |
| 4,957,018 A * | 9/1990 | Jakubiec | ................. | F16K 3/182 251/297 |

(Continued)

FOREIGN PATENT DOCUMENTS

EP   2224153   9/2010

*Primary Examiner* — Mary McManmon
*Assistant Examiner* — David Colon Morales
(74) *Attorney, Agent, or Firm* — Muncy, Geissler, Olds & Lowe, P.C.

(57) ABSTRACT

A gate valve with linkage structure includes at least a power cylinder, a valve body having a valve opening; a gate assembly in the valve body, having a main gate board and an air-tight gate board neighborly disposed, and connected with one end of the air-tight gate board by at least one parallel linkage; and at least a press bar, with one end pivotally connected to the air-tight gate board and the other end extending to form a press end. A linkage bar is pivotally connected to the press bar and also pivotally connected to the main gate board. Therefore, the gate assembly is driven to seal the valve opening; the air-tight gate board moves away from the main gate board with the linkage function; a sealing force is generated to keep the air-tightness between the air-tight gate board and the valve opening.

7 Claims, 7 Drawing Sheets

(56) References Cited

U.S. PATENT DOCUMENTS

| | | | |
|---|---|---|---|
| 5,188,145 A * | 2/1993 | Mathieu | F16K 3/18 |
| | | | 137/340 |
| 5,269,491 A * | 12/1993 | Reynolds | F16K 51/02 |
| | | | 251/169 |
| 5,755,255 A | 5/1998 | Iwabuchi | |
| 5,881,998 A * | 3/1999 | Brenes | F15B 15/16 |
| | | | 251/204 |
| 5,975,492 A | 11/1999 | Brenes | |
| 6,056,266 A | 5/2000 | Blecha | |
| 6,416,037 B1 | 7/2002 | Geiser | |
| 6,471,181 B2 | 10/2002 | Duelli | |
| 6,488,262 B1 * | 12/2002 | Oka | F16K 3/182 |
| | | | 251/193 |
| 6,561,483 B2 | 5/2003 | Nakagawa | |
| 6,612,546 B2 * | 9/2003 | Young | F16K 51/02 |
| | | | 251/158 |
| 7,134,642 B2 | 11/2006 | Seitz | |
| 7,237,567 B2 * | 7/2007 | Wu | F16K 3/182 |
| | | | 137/269 |
| 7,871,061 B1 * | 1/2011 | Mandeville, Jr. | F16K 3/04 |
| | | | 251/169 |
| 8,177,190 B2 | 5/2012 | Maerk | |
| 8,448,918 B2 * | 5/2013 | Wagner | F16K 51/02 |
| | | | 251/193 |
| 8,511,642 B2 | 8/2013 | Schoch et al. | |
| 8,678,344 B2 | 3/2014 | Ehrne et al. | |
| 2006/0011140 A1 | 1/2006 | Blahnik et al. | |
| 2007/0272888 A1 | 11/2007 | Tichy | |
| 2011/0057136 A1 * | 3/2011 | Ehrne | F16K 3/182 |
| | | | 251/319 |

\* cited by examiner

GATE VALVE WITH LINKAGE STRUCTURE

BACKGROUND OF THE INVENTION

1. Field of the Invention

The present invention relates to seal structures of valve, and more particularly, to a vacuum valve driven by a linkage structure for sealing the air-tight valve board against the valve opening.

2. Description of the Related Art

In U.S. Pat. No. 7,134,642, a vacuum gate valve, as shown in FIGS. 1a, 1b, and 1c, applies a control unit (such as a hydraulic and rotational unit), such that the valve stem is allowed to move freely along two directions, whereby the valve not only linearly moves along the valve stem axis (in parallel against the valve opening) for covering the valve opening, but also moves in vertical against the valve opening. Thus, when the valve board moves to the valve opening, the valve board is able to produce an addition sealing force upon the valve opening, so as to assure the air-tightness between the valve board and the valve opening.

However, such prior arts usually require a moving track controlling mechanism such as a slide rail disposed at the position of the hydraulic cylinder, wherein different sizes of valve boards and valve openings of vacuum valves with different models or sizes shall be calculated accurately and respectively, such that the valve board is allowed to move to the valve opening and firmly seal the valve opening. Otherwise, if the valve board is unable to cover the valve opening in parallel, the valve board possibly fails to appropriately seal the valve opening. As a result, the air-tightness of the vacuum valve is not achieved. Furthermore, after long period of being repeatedly used, wearing and accuracy deviation of the control unit may occur; in addition, the control unit is usually placed deep in the vacuum valve, causing the difficulty of maintenance.

SUMMARY OF THE INVENTION

For improving aforementioned issues, the present invention discloses a gate valve with linkage structure. When the gate assembly moves to be in alignment with the valve opening, the air-tight gate board of the gate assembly is allowed to vertically move toward the valve opening by use of the linkage, such that the air-tight gate board firmly covers the valve opening.

The present invention provides valve gate with linkage structure, comprising:

- at least a power cylinder, provided with a driving axle capable of axially moving;
- a hollow valve body, with one end being an open end having a cover and the other end being a cylinder seat for receiving the power cylinder, an axle bore passing through the cylinder seat for the driving axle to penetrate into the valve body, wherein at least a valve opening is disposed on a lateral side of the valve body adjacent to the open end;
- a gate assembly, disposed in the valve body and provided with a main gate board and an air-tight gate board neighboring on the main gate board, while the main gate board is connected to an end part of the air-tight gate board by use of at least a parallel linkage; and
- at least a press bar, with one end pivotally connected to an end part of the air-tight gate board and the other end extending toward the cover to form a press end, wherein one end of a linkage bar is pivotally connected to the middle of the press bar, with the other end of the linkage bar pivotally connected to an end of the main gate board.

The main objective of the present invention is that the gate assembly is driven to move axially by the driving axle. When the gate assembly is in alignment with the valve opening, the press end of the press bar is pressed, and the air-tight gate board is moved away from the main gate board by the linkage effect produced by the press bar, the linkage bar, and the parallel linkage, whereby the air-tight gate board moves toward the valve opening to firmly seal the valve opening.

Another objective of the present invention is that the maintenance of the present invention is easy and time saving. During the maintenance, user needs only to open the cover and unscrew the screw members between the gate assembly and the driving axle, whereby the whole gate assembly is allowed to be taken out for repairing or replacing, thus greatly shorten the time cost for work suspension during the machine maintenance.

Still another objective of the present invention is that at least a stop member is disposed at the open end of the valve body. The stop member is in axial alignment with the press end of the press bar. When the gate assembly moves to be in alignment with the valve opening, the press end contacts the stop member, thereby driving the air-tight gate board to move while the stop member bears the counterforce of the pressing force. Therefore, the overall structural strength is enhanced; also, the maintenance of the stop member is easy.

Still another objective of the present invention is that at least a through groove is disposed on the main gate board. A roller bearing is pivotally disposed in the through groove, and the roller bearing partially protrudes on the lateral surface of the main gate board adjacent to the air-tight gate board. Furthermore, the air-tight gate board is concavely provided with a push groove for receiving the roller bearing. When the air-tight gate board is operated, the roller bearing works with the push groove, so as to disperse the counterforce born by the air-tight gate board, thereby preventing the air-tight gate board from being bent and deformed, also increasing the stability and service life of the product.

DETAILED DESCRIPTION OF THE INVENTION

Figure 1:
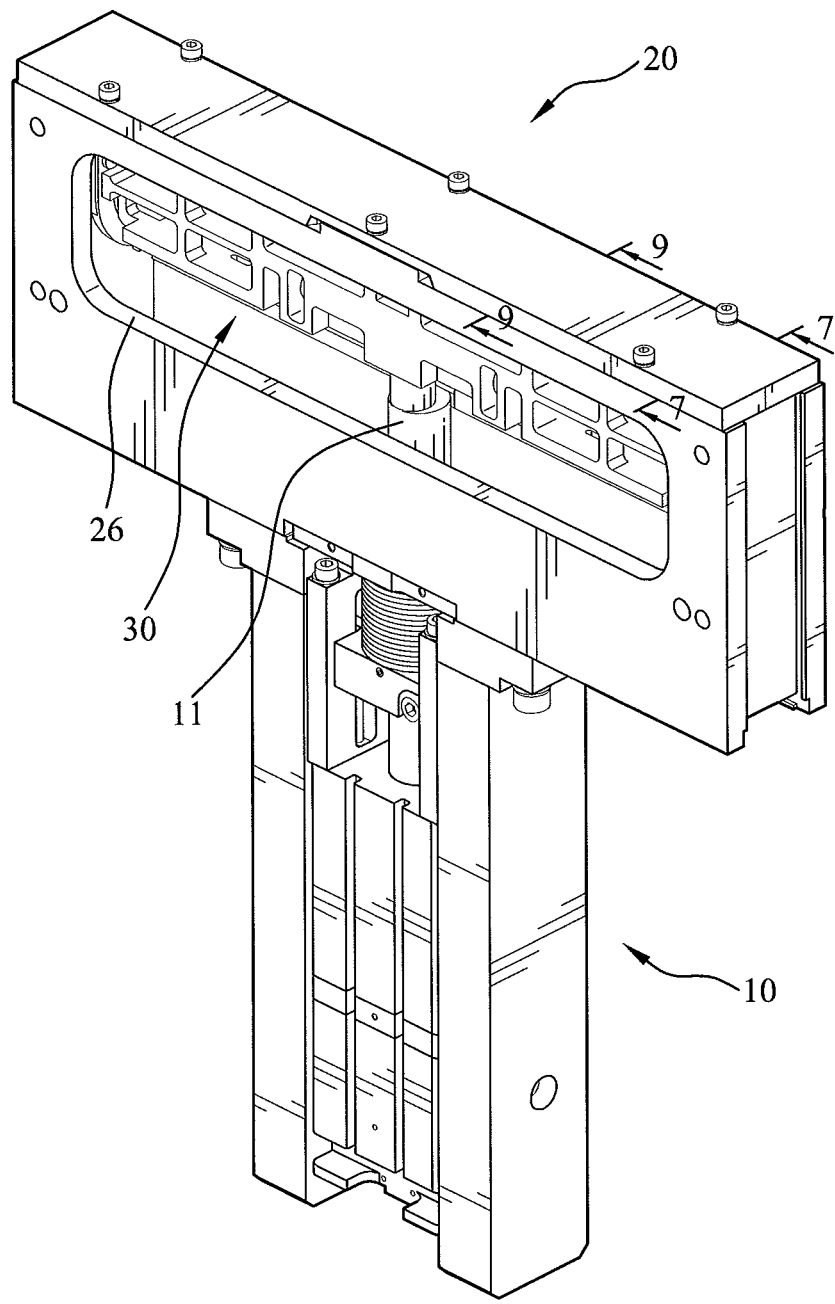
FIG. 1 is a perspective view of the gate valve with linkage structure in accordance with the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 5, the present invention provides a gate valve with linkage structure, comprising at least a power cylinder 10, a hollow valve body 20, a gate assembly 30, and at least a press bar 40.

The power cylinder 10 is provided with a driving axle 11 capable of axially moving.

The hollow valve body 20 has one end thereof being an open end 21 provided with a cover 22, and the other end thereof provided with a cylinder seat 23 for receiving the power cylinder 10. An axle bore 24 passes through the cylinder seat 23 for the driving axle 11 to penetrate through and into the valve body 20. Therein, at least a valve opening 25 is disposed on a lateral side of the valve body 20 adjacent to the open end 21, and a hole 26 is disposed on the other lateral side of the valve body 20 opposite to the valve opening 25.

The gate assembly 30 is disposed in the valve body 20 and provided with a main gate board 31 and an air-tight gate board 32 neighboring on the main gate board 31. The main gate board 31 is screwed to an end of the driving axle 11 by use of a screw member 311. Therein, the main gate board 31 is connected to an end part of the air-tight gate board 32 by use of at least a parallel linkage 33. In a preferred embodiment, the main gate board 31 is connected with the air-tight gate board 32 by use of two parallel linkages 33 disposed between the two ends of the air-tight gate board 32; also, a four-linkage structure is formed among the main gate board 31, the two parallel linkages 33, and the airtight gate board 32. In a more preferred embodiment, the four-linkage structure forms a parallelogram linkage structure.

Figure 3:
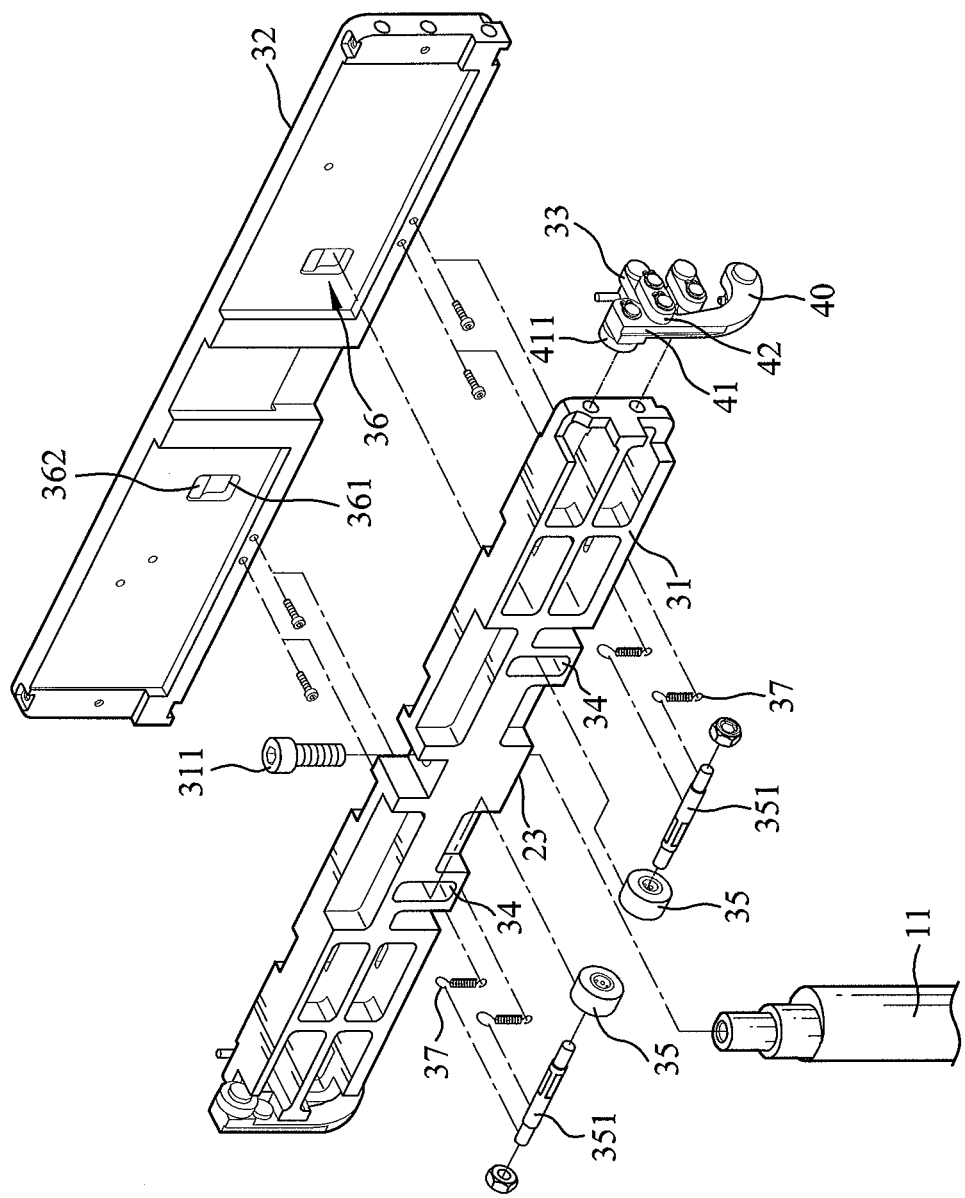
FIG. 3 is a second partially exploded view of the gate valve with linkage structure in accordance with the present invention.
Figure 8:
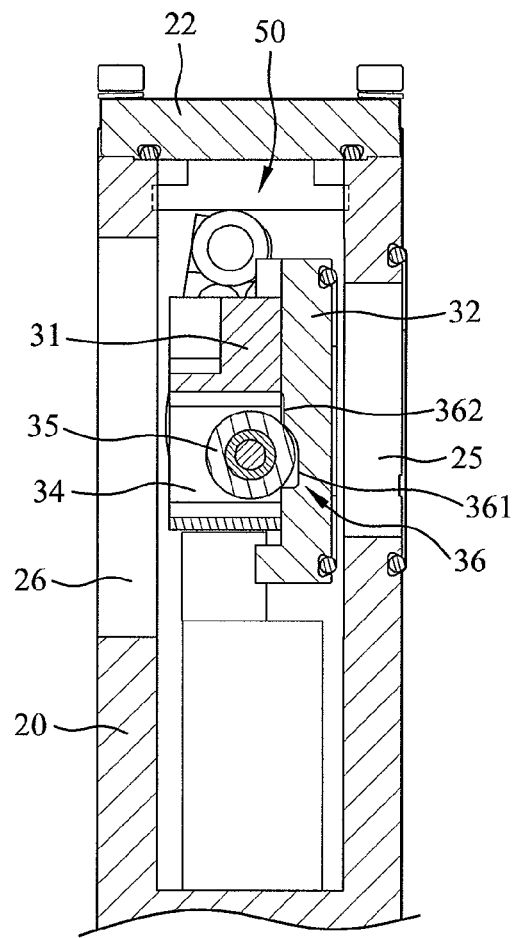
FIG. 8 is a partially sectional schematic view illustrating the operation process of the roller bearing of the present invention.

At least a through groove 34 is disposed between the two ends of the main gate board 31. A roller bearing 35 is pivotally disposed in the through groove 34 by use of an axle 351, and the roller bearing 35 partially protrudes on the lateral surface of the main gate board 31 adjacent to the air-tight gate board 32. Furthermore, the air-tight gate board 32 is concavely provided with a push groove 36 for receiving the roller bearing 35. The push groove 36 has a first section 361 and a second section 362, wherein the depth of the first section 361 is deeper than the depth of the second section 362 (as shown in FIG. 3 and FIG. 8), and the second section 362 is positioned at one end of the push groove 36 adjacent to the open end 21.

One end of the press bar 40 is pivotally connected to an end part of the air-tight gate board 32, while the other end of the press bar 40 extends toward the cover 22 to form a press end 41. A bearing member 411 is disposed at the press end 41. Therein, one end of a linkage bar 42 is pivotally connected to the middle of the press bar 40, with the other end of the linkage bar 42 pivotally connected to an end of the main gate board 31. Furthermore, as shown in FIG. 3, the linkage bar 42 extends from the pivot junction between the linkage bar 42 and the main gate board 31 toward the direction away from the air-tight gate board 32, and the press bar 40 is in a shape similar to an L shape. In the preferred embodiment, the two ends of the gate assembly 30 are provided with a press bar 40, respectively.

Figure 2:
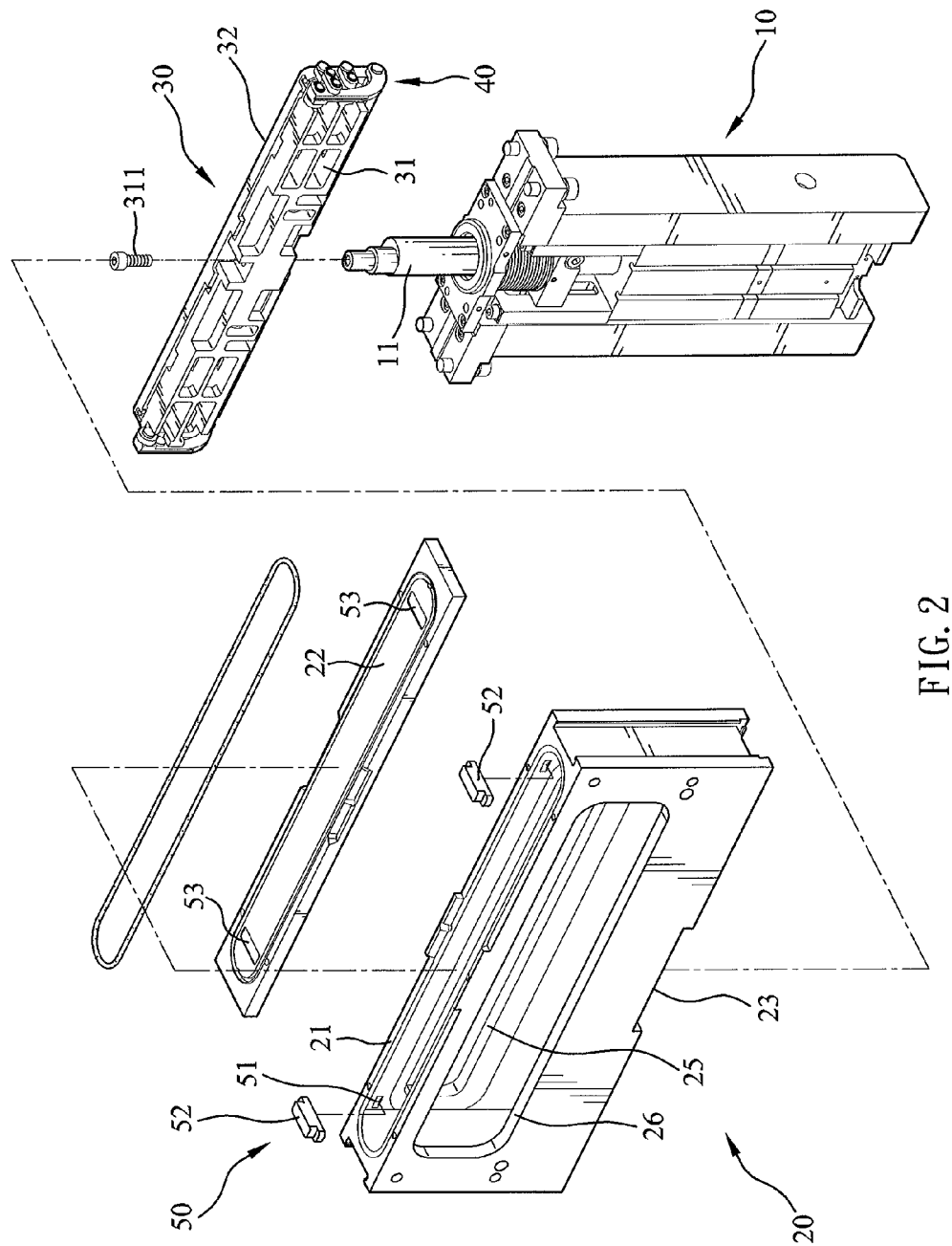
FIG. 2 is a partially exploded view of the gate valve with linkage structure in accordance with the present invention.
Figure 4:
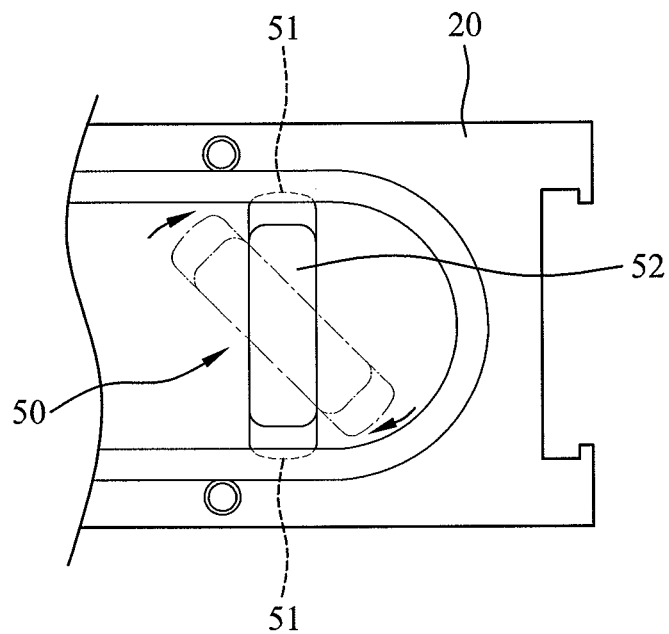
FIG. 4 is a schematic view illustrating the installation process of the stop member provided by the present invention.

In addition, at least a stop member 50 is disposed at the open end 21 of the valve body 20. Two inner walls of the open end 21 of the valve body 20 are provided with an arc recess 51 symmetrically disposed, respectively, for receiving the stop member 50; further, two ends of the stop member 50 are both an arc-shaped end. Therein, the length of the stop member 50 is larger than the width of the opening of the open end 21. As shown in FIG. 4, the stop member 50 is obliquely placed into the open end 21 and subsequently rotated, so as to engage the two ends of the stop member 50 with the arc recess 51. Furthermore, as shown in FIG. 2, the stop member 50 is convexly provided with an engage end 52 toward the cover 22, and the inner side of the cover 22 is concavely provided with at least a position groove 53 for receiving the engage end 52. Therefore, when the cover 22 is fixed to the open end 21, as shown in FIG. 5, the position groove 53 is able to fix the position of the stop member 50, so as to prevent the stop member 50 from departing from the arc recess 51.

Therein, at least a spring member 37 is disposed between the main gate board 31 and the air-tight gate board 32. As shown in FIG. 3, one end of the spring member 37 is connected to the axle 351 of the roller bearing 35, while the other end is fastened to the air-tight gate board 32, such that an elastic pulling force is produced for the air-tight gate board 32 to permanently lean against the main gate board 31. In the preferred embodiment, the driving axle 11 is positioned at the center of the gate assembly 30, while each side of the gate assembly 30 is provided with a roller bearing 35 and a push groove 36, respectively, with two spring members 37 disposed on each of the axles 351, respectively.

With the foregoing configuration, operation of the present invention will be illustrated below.

Figure 5:
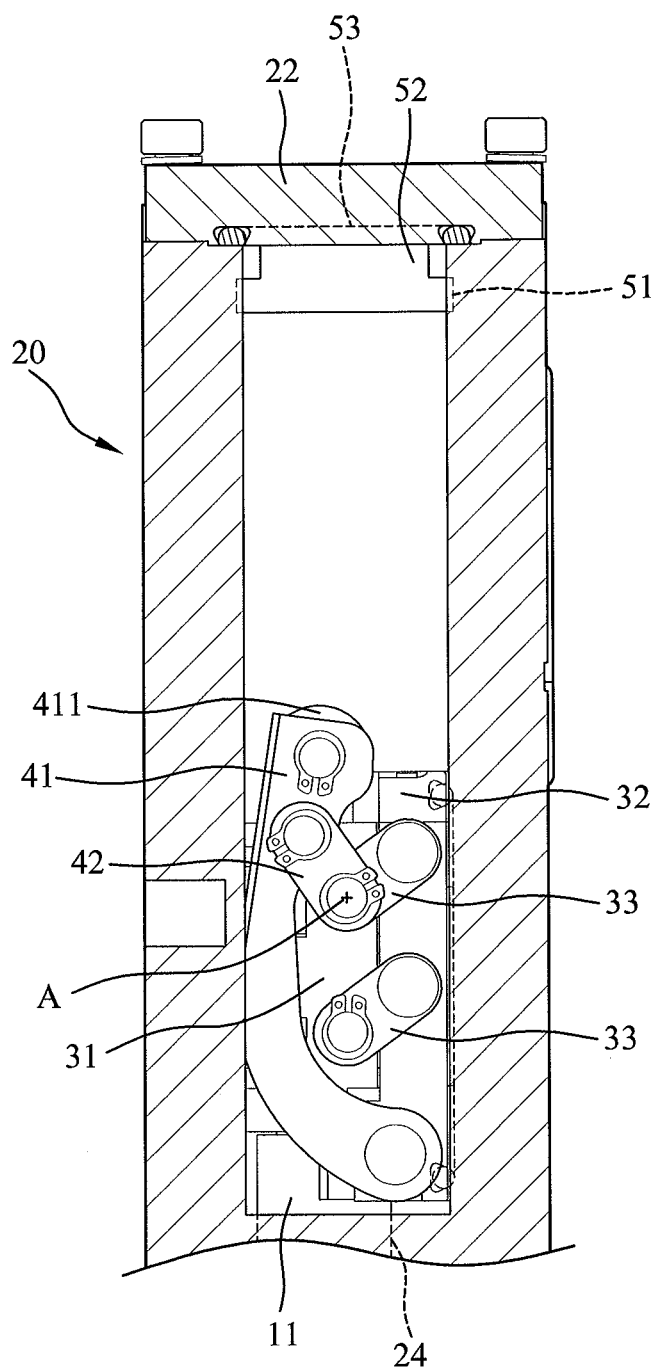
FIG. 5 is a partially sectional view of the gate valve with linkage structure in accordance with the present invention.

When the valve opening 25 opens, the gate assembly 30 is placed at one end of the valve body 20 in opposite to the open end 21, and the air-tight gate board 32 leans against the main gate board 31, as shown in FIG. 5. Meanwhile, the roller bearing 35 is placed in the deeper first section 361 of the push groove 36.

Figure 6:
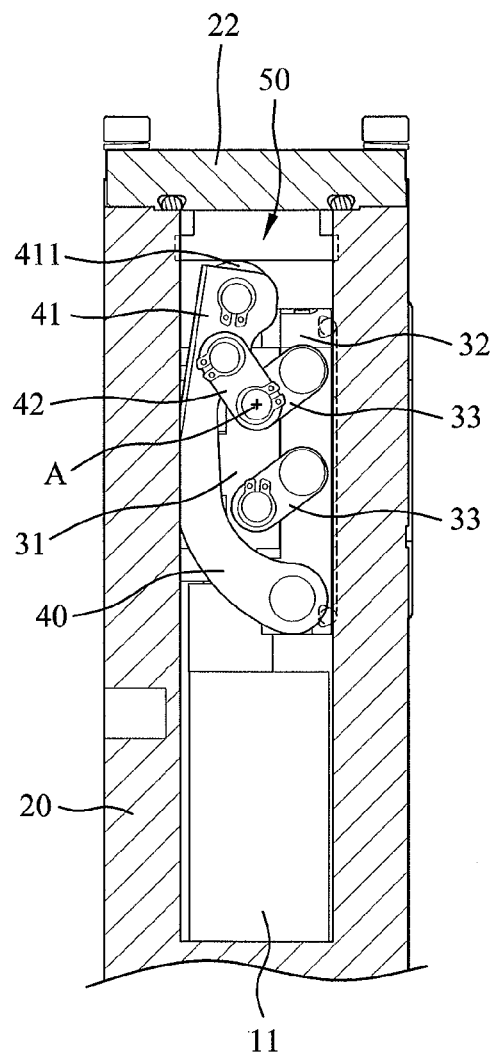
FIG. 6 is a partially sectional schematic view illustrating the operation process of the present invention.
Figure 7:
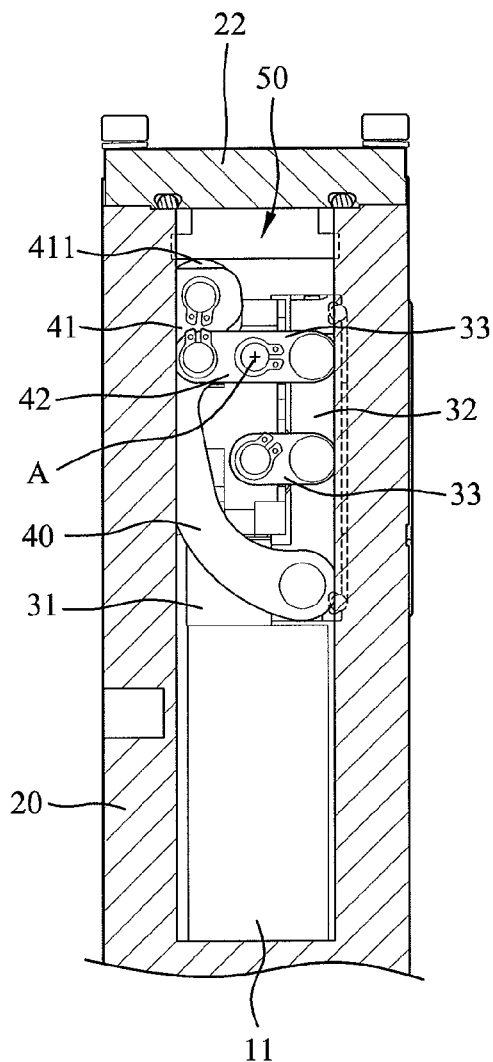
FIG. 7 is a second partially sectional schematic view illustrating the operation process of the present invention.

When the valve opening 25 is to be closed, the driving axle 11 of the power cylinder 10 drives the gate assembly 30 to axially move in parallel to the valve opening 25 along the driving axle 11 toward the open end 21, as shown in FIG. 6. When the gate assembly 30 is about to be in alignment with the valve opening 25, the bearing member 411 of the press end 41 contacts the stop member 50; with the continuous operation of the driving axle 11, the stop member 50 imposes a counter force upon the press end 41, so as to press the press bar 40. Therein, due to the pivot junction between the linkage bar 42 and the main gate board 31 being a fixed central axle, when the press end 41 of the press bar 40 bears a pressing force, the linkage bar 42 swings counterclockwise with the pivot junction A as the central axle, whereby the press bar 40 pushes the air-tight gate board 32 away from the main gate board 31, so as to cause the air-tight gate board 32 to move toward the valve opening 25 until the air-tight gate board 32 firmly seal the valve opening 25, as shown in FIG. 7.

At the same time, because the main gate board 31, the two parallel linkages 33, and the air-tight gate board 32 form a parallelogram linkage structure, when the press bar 40 pushes the air-tight gate board 32 to move, upper and lower ends of the air-tight gate board 32 are assured to move averagely, so as to make sure the air-tight gate board 32 leans against the valve opening 25 averagely. Thus, air-tightness is prevented from being weakened due to imbalance of the valve opening 25.

Figure 9:
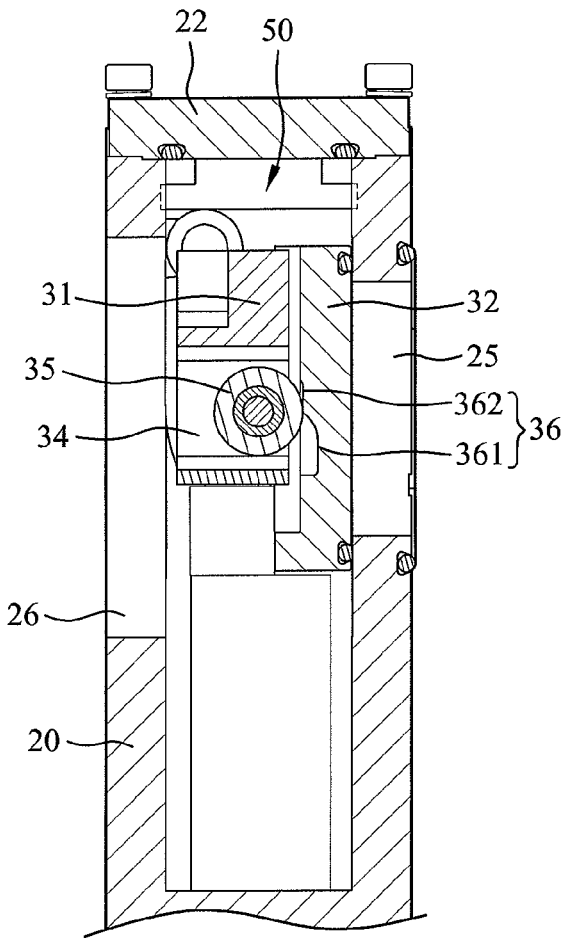
FIG. 9 is a second partially sectional schematic view illustrating the operation process of the roller bearing of the present invention.

Moreover, referring to FIG. 8 and FIG. 9, when the air-tight gate board 32 is operated, the roller bearings 35 accordingly move to the second sections 362 of the push grooves 36. Also, due to the depth of the second sections 362, when the air-tight gate boards 32 move away from the main gate board 31, the roller bearings 35 remain leaning against the air-tight gate board 32. Therefore, when the gate valve with linkage structure of the present invention is in a larger size, multiple roller bearings 35 and corresponding push grooves 36 are allowed to be disposed thereon, so as to disperse the counterforce born by the air-tight gate board 32, thereby preventing the air-tight gate board 32 from being bent and deformed, assuring the air-tightness between the air-tight gate board 32 and the valve opening 25, and increasing the stability and the service life of the present invention.

On the other hand, when the valve opening 25 is to be reversely opened, the power cylinder 10 triggers the driving axle 11 and the gate assembly 30 to descend. With the bearing member 411 of the press end 41 gradually departing from the stop member 50, the spring members 37 causes the air-tight gate board 32 and the main gate board 31 to be repositioned to lean against each other by use of the elastic pulling force, such that the air-tight gate board 32 departs from the valve opening 25, whereby the valve opening 25 is opened.

In addition, the maintenance of the present invention is easy and time saving. During the maintenance, user needs only to open the cover 22 and unscrew the screw members 311 between the gate assembly 30 and the driving axle 11, whereby the whole gate assembly 30 is allowed to be taken out for repairing or replacing process, thus greatly shorten the time cost for work suspension during the machine maintenance.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gate valve with linkage structure, comprising:
   at least a power cylinder, provided with a driving axle capable of axially moving;
   a hollow valve body, with one end being an open end having a cover and another end being a cylinder seat for receiving the power cylinder, an axle bore passing through the cylinder seat for the driving axle to penetrate into the valve body, at least a stop member disposed at the open end of the valve body, two ends of the stop member formed in an arc-shaped end, an inner wall of the open end of the valve body provided with two arc recesses for correspondingly receiving the stop member, wherein at least a valve opening is disposed on a lateral side of the valve body adjacent to the open end;
   a gate assembly, disposed in the valve body and provided with a main gate board and an air-tight gate board neighboring on the main gate board, while the main gate board is connected to an end of the driving axle, wherein the main gate board is connected with an end part of the air-tight gate board by use of at least a parallel linkage; and
   at least a press bar, with one end pivotally connected to an end part of the air-tight gate board and another end extending toward the cover to form a press end, wherein one end of a linkage bar is pivotally connected to the middle of the press bar, with another end of the linkage bar pivotally connected to an end of the main gate board.

2. The gate valve of claim 1, wherein the press end is provided with a bearing member.

3. The gate valve of claim 1, wherein the stop member is convexly provided with an engage end toward the cover, and an inner side of the cover is provided with a position groove for receiving the engage end.

4. The gate valve of claim 1, wherein a length of the stop member is larger than a width of the opening of the open end.

5. The gate valve of claim 1, wherein at least a through groove is disposed on the main gate board, and a roller bearing is pivotally disposed in the through groove, while the roller bearing partially protrudes on a lateral surface of the main gate board adjacent to the air-tight gate board, with the air-tight gate board concavely provided with a push groove for receiving the roller bearing.

6. The gate valve of claim 5, wherein the push groove is provided with a first section and a second section, while a depth of the first section is deeper than a depth of the second section, and the second section is positioned at one end of the push groove adjacent to the open end.

7. The gate valve of claim 1, wherein at least a spring member is disposed between the main gate board and the air-tight gate board.

* * * * *